Jan. 7, 1969     A. J. INZERILL     3,420,445
AUTOMATIC DEODORANT SPRAY DEVICE FOR BATHROOMS AND THE LIKE
Filed June 16, 1966     Sheet 1 of 3
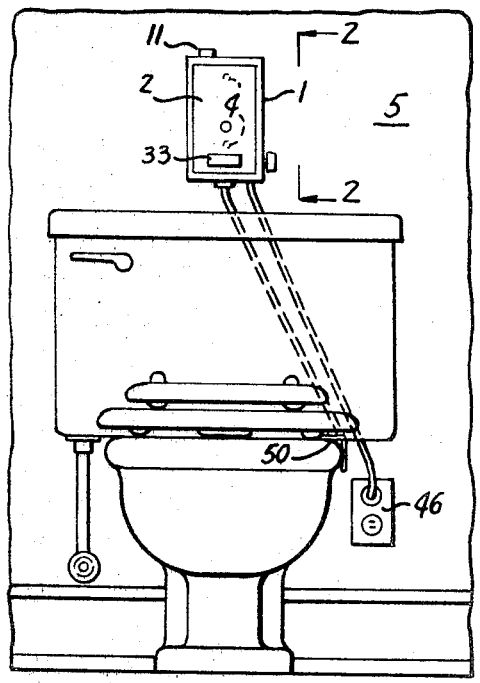
FIG.1
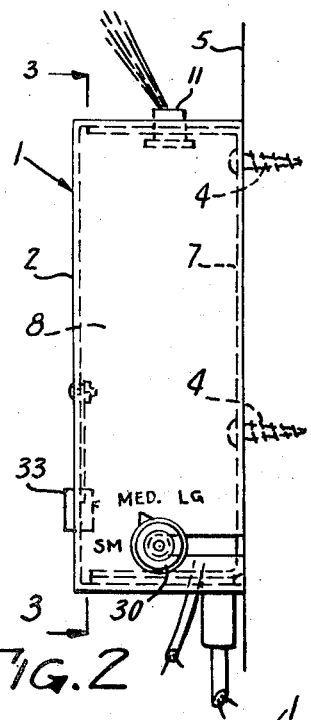
FIG.2
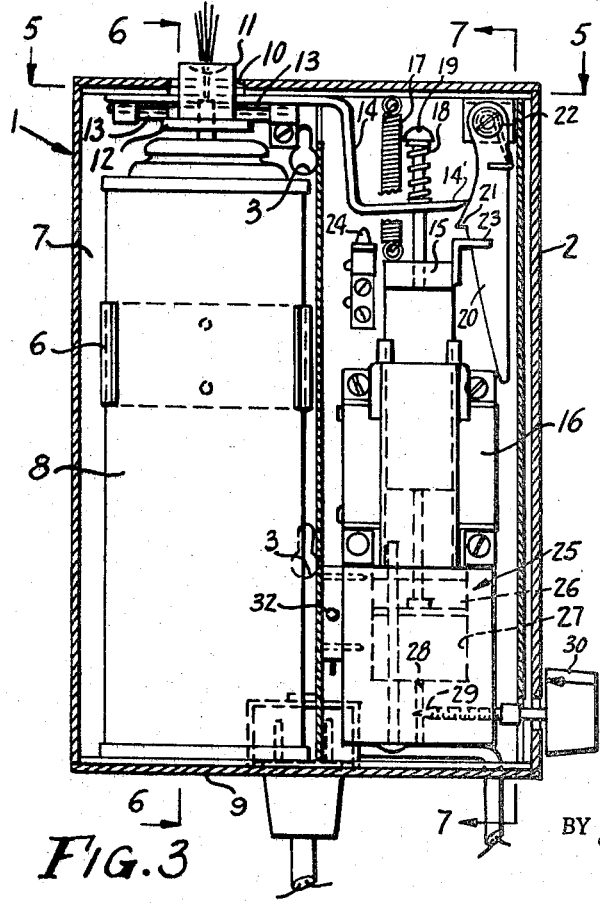
FIG.3
FIG.4
INVENTOR.
ANDREW J. INZERILL
BY Donald L. Maxson.
ATTORNEY.

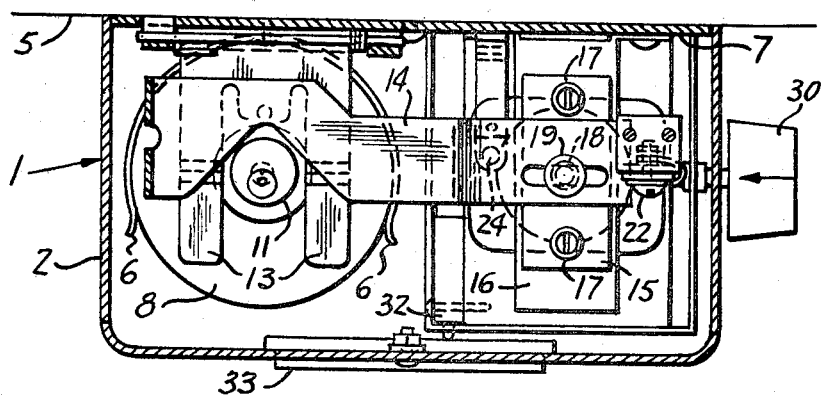
FIG. 5
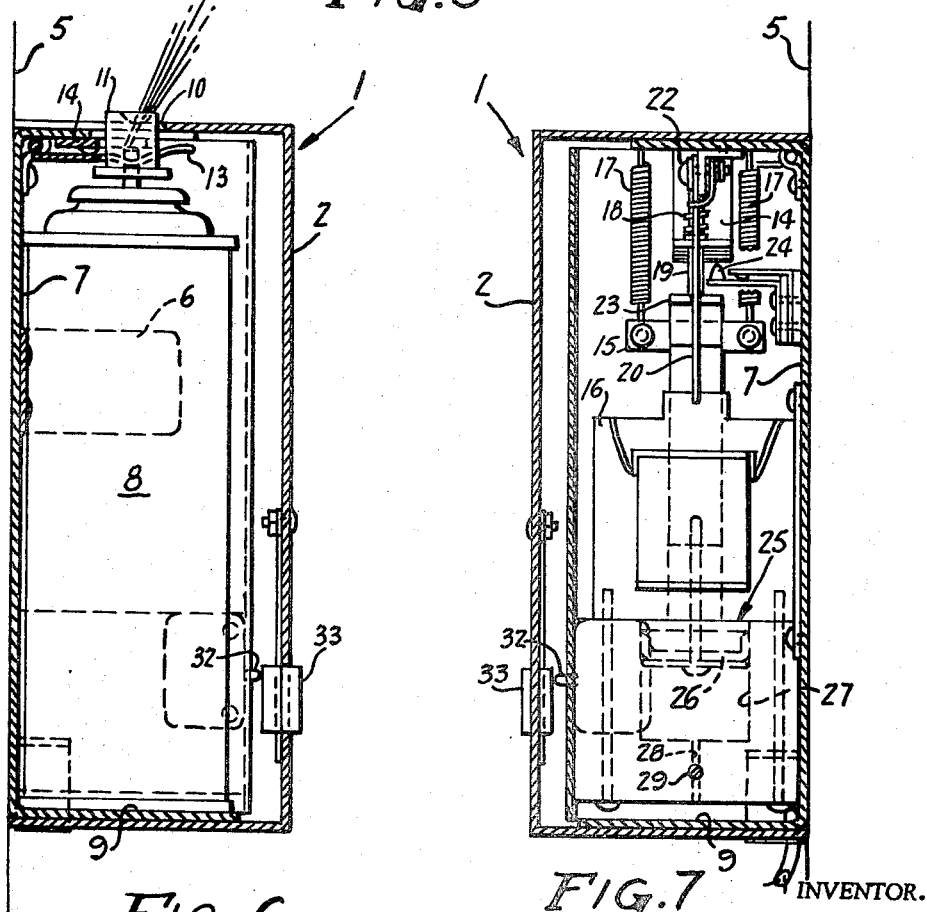
FIG. 6
FIG. 7
INVENTOR.
ANDREW J. INZERILL
BY Donald L. Mayson
ATTORNEY.

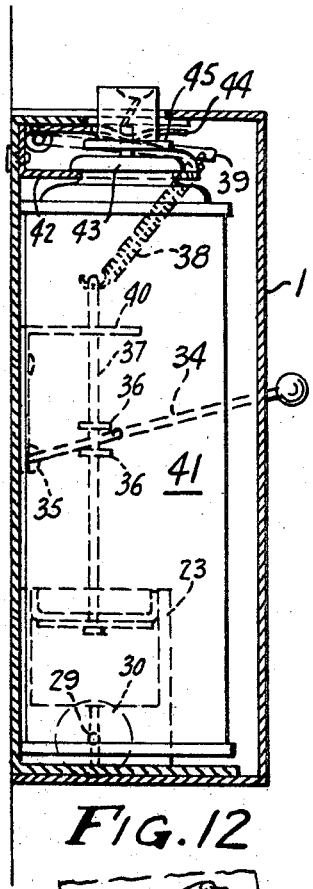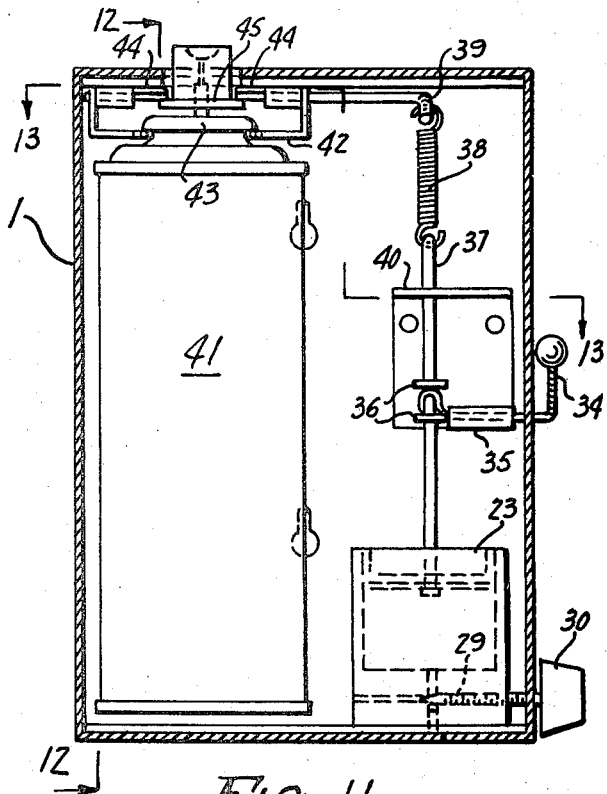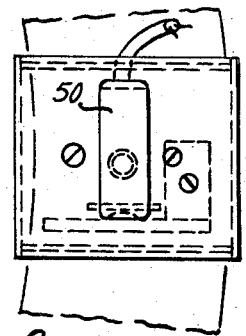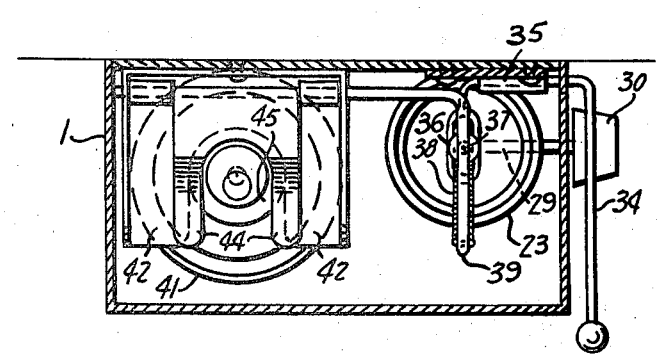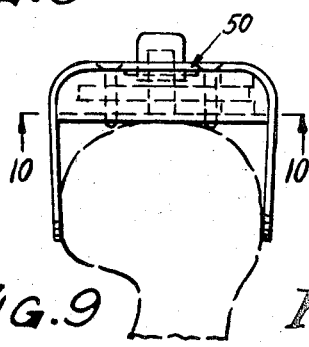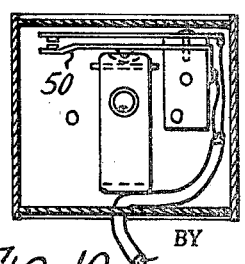

United States Patent Office 3,420,445
Patented Jan. 7, 1969

3,420,445
AUTOMATIC DEODORANT SPRAY DEVICE FOR BATHROOMS AND THE LIKE
Andrew J. Inzerill, 24 Mill St., Tobyhana, Pa. 18466
Filed June 16, 1966, Ser. No. 558,137
U.S. Cl. 239—274     11 Claims
Int. Cl. B05b 7/24; E03d 9/00

ABSTRACT OF THE DISCLOSURE

A deodorant spraying device for bathrooms and other areas, which can be either manually or automatically operated and has control means associated therewith for varying the duration of the spraying period.

---

This invention relates to an improved automatic deodorant spray device for bathrooms and the like, which may be operated either manually or automatically by an off-on-off switch positioned on the rim of a toilet bowl under the hinged seat therefor.

An object of the invention to provide an improved solenoid operated automatic deodorant spray device for bathrooms and the like with means for selectively varying the duration of the spraying action according to a preselection air control mechanism.

Another object of the invention is to provide an improved solenoid and dashpot operated automatic deodorant spray device which may be either manually or automatically set into operation, or can be controlled by a bimetal heating element.

A further object of the invention is to provide an improved solenoid and coupled dashpot device for automatically spraying a deodorant spray upwardly at an approximate 30° angle from a replaceable aerosol can or bomb supported in the casing or housing of said device.

A still further object of the invention is to provide an improved solenoid and coupled dashpot operated automatic deodorant spray device in which an aerosol can or bomb of deodorant spray under pressure may be supported in said device for replacement either by a can or bomb body supporting C-clip or by means engaging the neck portion of said can or bomb.

Other objects will appear as the description proceeds.

In the accompanying drawings which form a part of my application:

FIGURE 1 is a front view of my improved device installed with a toilet bowl and being toilet seat controlled;

FIGURE 2 is a sectional view taken on the line 2—2 of FIGURE 1;

FIGURE 3 is a partial sectional view with housing cover removed taken on the line 3—3 of FIGURE 2;

FIGURE 4 is a partial sectional view of the solenoid with bimetal control therefor;

FIGURE 5 is a partial sectional view taken on the line 5—5 of FIGURE 3;

FIGURE 6 is a partial sectional view taken on the line 6—6 of FIGURE 3;

FIGURE 7 is a partial sectional view taken on the line 7—7 of FIGURE 3;

FIGURE 8 is a plan view of the toilet bowl supported off-on-off switch;

FIGURE 9 is a front elevation of the off-on-off control switch mounted on the rim of a toilet bowl;

FIGURE 10 is a partial sectional view taken on the line 10—10 of FIGURE 9;

FIGURE 11 is a front elevation partly in section of the hand operated dashpot modified spray device;

FIGURE 12 is a partial sectional view taken on the line 12—12 of FIGURE 11; and

FIGURE 13 is a partial sectional view taken on the line 13—13 of FIGURE 11.

Like characters of reference are used throughout the following specification and the accompanying drawings to designate corresponding parts.

In carrying out my invention, I provide an improved automatic solenoid and coupled dashpot operated spray device for spraying deodorant spray mist in a bathroom or the like, comprising a casing or housing 1 having a removable front cover 2 and key openings 3 in the back thereof for screws or other fastening means 4, whereby the same may be secured to the wall 5 of a bathroom or the like.

A C-clip 6 is fixed to the inner surface of the back wall 7 and removably supports an aerosol can or bomb 8 of pressurized deodorant spray fluid which rests on the bottom 9 of the casing or housing 1 with the upwardly directed nozzle of the can or bomb extending through an opening 10 in the top wall of the casing or housing 1 to spray the deodorant material upwardly at an approximate 30° angle when operated by the device.

The nozzle 11 for the aerosol can or bomb 8 is provided with an annular flange 12 which is engaged by the fixed spaced spring fingers 13 which cooperate with the pivotally mounted end of the depressor arm 14 whose opposite end is engaged and depressed by the action of the solenoid armature 15 when the same is electrically actuated.

The operating mechanism comprises a solenoid 16 whose armature 15 is resiliently held in its uppermost position by means of the coil springs 17 attached thereto and to the top wall of the casing or housing 1. A cushioning spring 18 is disposed about the upper end of the armature 15 between the headed end 19 thereof and the depressor arm 14, as clearly shown in FIGURE 4 of the drawings. The spring 18 also acts as a compensating device when different size spray cans are used.

A spring tensioned locking cam 20 is provided with a cam nose surface 21 and is pivoted at 22 to the upper wall of the casing or housing 1, and cooperates with a release finger 23 carried by the solenoid armature 15. Contacts having a breaker 24 are connected in series with the solenoid winding and are normally in closed position except when the device is operated.

A dashpot 25 is mounted on the lower end of the solenoid armature 15 and comprises a piston 26 operating in a cylinder 27 whose lower end is provided with an air suction release passage 28 controlled by the spray adjustment valve 29 and knob 30, whereby the duration of spraying from the aerosol bomb may be varied, as for example for 1½ seconds, 3 seconds, and for a longer spray period of 6 seconds. Suitable means for indicating the position of the air control valve may be provided as desired.

In operation, when the toilet seat is depressed and the off-on-off switch 50 momentarily closed, the solenoid will be actuated to snap the armature 15 downwardly together with the dashpot piston 26 and the depressor arm 14, the locking cam 20, under its spring tension, will snap over toward the depressor arm 14 so that its cam nose 21 is disposed above the contact end 14' of the depressor arm 14, the downward movement of the depressor arm 14 will also actuate the contact breaker 24 to open the contacts to open the circuit to the solenoid coil, the depressor arm 14 pivots downwardly to engage and compress the spring fingers 13 to open the valve of the aerosol bomb 8 to direct the spraying of a "shot" of deodorant mist into the room where the device is installed. The contact end 14' of the depressor arm 14 is now held down by the cam nose 21 of the locking cam 20. As the suction is released below the dashpot piston 26, the springs 17 will draw the armature 15 upwardly to its original position, the release finger 23 again contacting the locking cam 20 and moving the locking cam, which is carrying cam nose 21, away from the contact end 14' of the depressor arm 14, until the cam nose clears the contact end, whereby the depressor arm will snap upwardly under tension of the spring fingers 13, allowing the contacts 24 to again meet and be ready for the next cycle. The time that the depressor arm 24 is held down by the cam nose 21 and releases the spray is regulated by the amount of air allowed to enter the dashpot and vary the speed of the upward movement of said piston, armature and release fingers 23.

If desired, a bimetal heater device 31 may be used in lieu of the dashpot 25 to operate the release of the solenoid actuating means, which structure is shown in FIGURE 4 of the drawings.

A manually operated switch 32 may be connected in series with the solenoid coil and manually closed by the button 33 carried by the casing cover 2.

In FIGURES 11, 12 and 13, I have illustrated a modification of my spray device which eliminates the solenoid, and utilizes a dashpot only referenced 23, and being similar in structure as the dashpot shown in FIGURES 3, 4 and 7 of my drawings. A hand lever 34 will be pivoted at 35 to the back wall 7 of the casing or housing 1, and will cooperate and move between the ears 36 on the dashpot shaft 37. A spring 38 will connect to the upper end of the shaft 37 and to the depressor arm 39. The air suction release means for the dashpot will be similar to that described heretofore. A guide arm 40 will be supported from the back wall 7 of the housing 1 to guide the shaft 37 as it moves upwardly and downwardly.

The supporting means for the aerosol bomb 41 in FIGURES 11, 12 and 13 differs from that shown in FIGURES 3, 5 and 6, and comprises a fixed slotted can holder 42 which engages and supports the flange 43 on the neck of the bomb 41, and the spring spaced depressing fingers 44 which engage and depress the flanged valve 45 to operate the same when the hand lever 34 is moved downwardly, thus spraying the deodorant for the duration set by the dashpot 23. Obviously the spring 38 will draw the stem 37 to its raised position as the suction of air is released in the dashpot 23.

The device will be operated from a supply of house current through a floor plug 46.

Many minor changes in detail of construction may be resorted to without departure from the spirit of invention.

Having thus described my invention, what I claim as new and desire to secure by Letters Patent of the United States is:

1. An automatic deodorant spray device for bathrooms and the like, comprising, a housing, a deodorant spray bomb in said housing, an upwardly directed valve nozzle having a peripheral operating flange, depressible spring fingers engageable with said flange, a pivoted depressor arm engageable with said spring fingers for depressing the said valve nozzle for emitting a spray from said spray bomb, and spring tensioned means cooperating with said depressor arm for actuating the same.

2. A device as claimed in claim 1, and said last mentioned means including a dashpot.

3. A device as claimed in claim 2, and means for varying the time action of said dashpot.

4. A device as claimed in claim 3, and a solenoid coupled to said dashpot.

5. A device as claimed in claim 4, and a pivoted latching cam cooperating with said solenoid for holding and releasing the same when energized.

6. A device as claimed in claim 5, and a contact breaker operated by said depressor arm for opening the circuit to said solenoid after energization of said solenoid.

7. A device as claimed in claim 6, and an off-on-off switch remote from said device, and a source of electric power controlled by said switch for momentarily energizing said solenoid to cause the valve nozzle on said bomb to open and eject a spray of deodorant mist therefrom.

8. A device as claimed in claim 7, and a manually operated switch in said housing separate from said off-on-off switch for manually closing the circuit to said solenoid for operating said device.

9. The subject matter as claimed in claim 8, and a bimetal heater device for actuating said pivoted latching cam in lieu of said dashpot.

10. The subject matter as claimed in claim 9, and resilient tensioning means for said depressor arm.

11. An automatic deodorant spray device for bathrooms and the like, comprising a housing, a deodorant spray bomb in said housing, an upwardly directed valve nozzle having a peripheral operating flange on said bomb, depressible spring fingers engageable with the top of said flange, a pivoted depressor arm engageable at one of its ends with said spring fingers for depressing the said valve nozzle and causing emission of spray from said bomb, the other of its ends being engageable with the cam nose on a locking cam, said locking cam having means associated therewith to cause it to alternately hold and release said depressor arm and vary the duration of spraying time.

References Cited

UNITED STATES PATENTS

| | | | |
|---|---|---|---|
| 593,750 | 11/1897 | Marks | 239—274 XR |
| 1,326,603 | 12/1919 | Marshall | 251—55 XR |
| 2,159,405 | 5/1939 | Schubert | 251—48 |
| 2,534,464 | 12/1950 | Marini et al. | 239—274 |
| 2,963,259 | 12/1960 | Heyer et al. | 251—48 |
| 3,018,056 | 1/1962 | Montgomery | 222—504 XR |
| 3,127,060 | 3/1964 | Vosbikian et al. | 222—504 XR |
| 3,195,777 | 7/1965 | Hart | 222—504 XR |
| 3,203,594 | 8/1965 | Jones | 222—504 XR |
| 3,259,050 | 7/1966 | Grimm | 239—274 XR |

EVERETT W. KIRBY, *Primary Examiner.*

U.S. Cl. X.R.

239—337; 4—223; 222—504; 251—15